Aug. 6, 1957 T. W. KALBOW 2,801,430
ADJUSTABLE TAPPING FIXTURE
Filed March 1, 1954
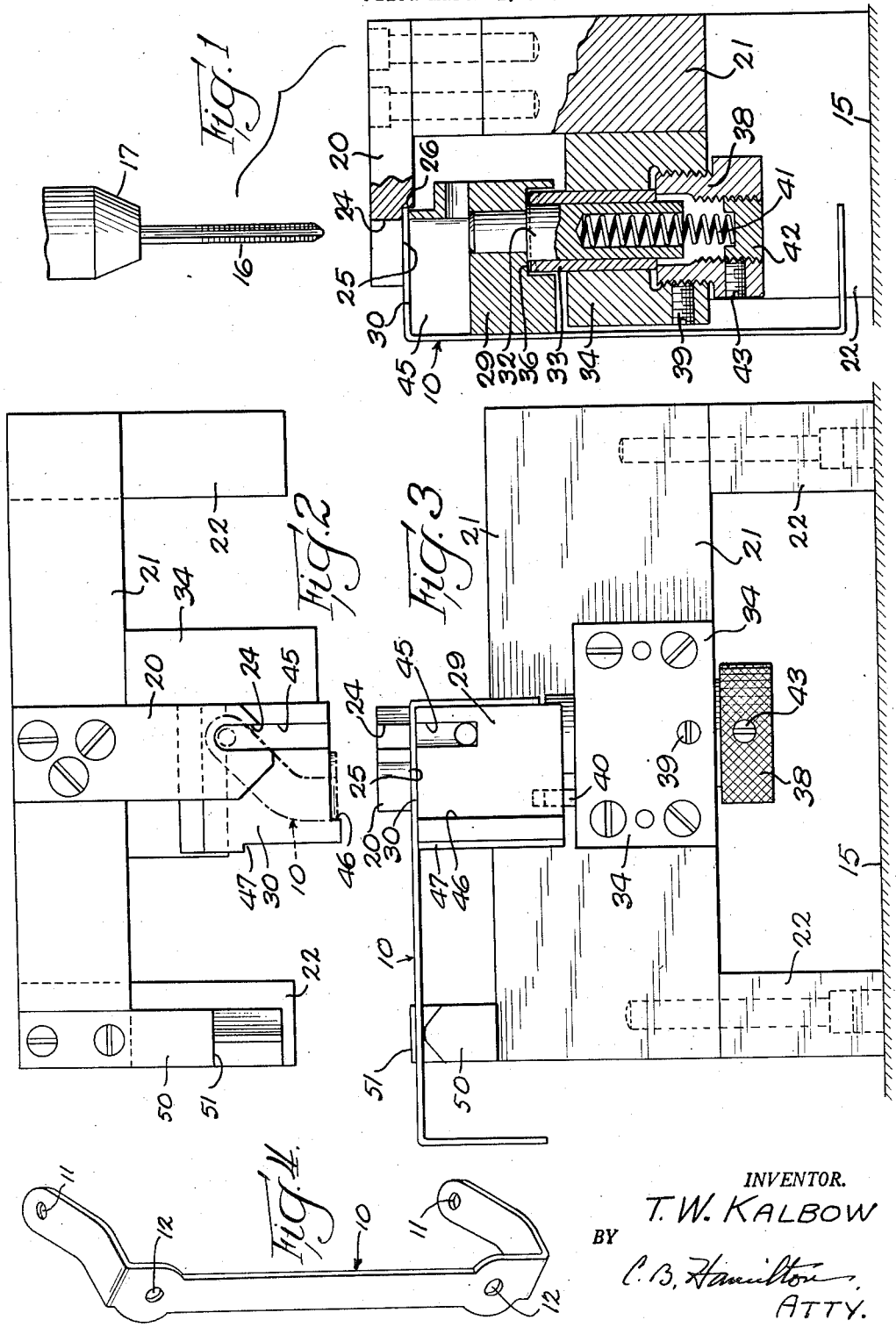
INVENTOR.
T. W. KALBOW
BY
C. B. Hamilton,
ATTY.

United States Patent Office 2,801,430
Patented Aug. 6, 1957

2,801,430

ADJUSTABLE TAPPING FIXTURE

Theodore W. Kalbow, Chicago, Ill., assignor to Western Electric Company, Incorporated, New York, N. Y., a corporation of New York Application March 1, 1954, Serial No. 413,281

3 Claims. (Cl. 10—107)

This invention relates to a tapping fixture and more particularly to a device for resiliently supporting a flat piece part in a tapping machine with the flat surface of the part disposed perpendicular to the movement of the tap.

An object of the invention is to provide an adjustable fixture for supporting and resiliently retaining a flat piece part in a tapping machine with the flat surface of the part perpendicular to the movement of the tap.

Another object of the invention is to provide an improved tapping fixture for supporting a flat apertured piece part with the surface thereof perpendicular to the axis of the tap and in a manner permitting movement of the part for the self-alignment of the tap with the aperture in the part.

A tapping fixture illustrating certain features of the invention includes a stationary stripper and upper retaining plate mounted in the path of movement of the tap and having a clearance aperture therefor, a platen having a flat surface disposed perpendicular to the axis of the tap for engaging a flat piece part and supporting it against the stripper plate, means for mounting the platen for movement in a direction parallel to the axis of the tap through a distance slightly greater than the maximum thickness of the parts being tapped, and spring means for urging the platen toward the stripper plate. Adjustable means is provided for varying the extent of movement of the platen to accommodate various thicknesses of the piece parts, and adjustable means is also provided for varying tension on the spring means for urging the platen against the piece part and the stripper plate.

Other objects and advantages of the invention will become apparent by reference to the following detailed description and the accompanying drawings illustrating a preferred embodiment thereof, in which—

Fig. 1 is a longitudinal vertical sectional view through the tapping fixture shown with portions of a tapping machine;

Fig. 2 is a plan view of the tapping fixture;

Fig. 3 is a front view of the tapping fixture; and

Fig. 4 is a perspective view of a piece part to be tapped.

The present fixture was designed to support a U-shaped sheet metal part 10 while a pair of apertures 11 are tapped in the transversely bent arms thereof and while a pair of apertures 12 are tapped in the web portion thereof. The fixture is mounted on a base plate 15 of a tapping machine in the path of travel of a tap 16 carried by the spindle chuck 17 of the tapping machine. The fixture comprises a stationary stripping plate 20 fixed to a horizontally disposed portion of a supporting frame 21 which has a pair of feet 22 secured to the base plate 15. The stationary stripping plate 20 has a slot 24 providing clearance for movement of the tap 16 and the plate 20 has a flat surface 25 against which portions of the part 10 are pressed during the tapping operations. A shoulder 26 formed on the stripper plate serves to aid in positioning the apertured portions of the part 10 in substantial alignment with the tap 16.

A pressure pad or platen 29 in the form of a block is provided for supporting the part 10 during the tapping thereof. The upper surface 30 of the pressure pad 29 is disposed in parallel relation to the surface 25 and the pad 29 is mounted for vertical movement toward and away from the stripper plate a distance slightly greater than the thickness of the part 10 to permit the arms or web portions of the part to be inserted between the surfaces 25 and 30 of the stripper plate and the platen. A cylindrical post 32 which is fixed to the platen 29 is slidably supported for vertical movement in a sleeve 33 which in turn is adjustably supported in a recess in a stationary block 34 attached and forming part of the stationary frame 21. The upper end of the sleeve 33 is adapted to engage a shoulder 36 on the platen 29 and limit its downward movement and the lower end of the sleeve 33 rests on the upper end of an adjustable bushing 38 which is threadedly supported for vertical movement in the block 34. By turning the threaded bushing 38 in the stationary block 34 the sleeve 33 may be adjusted to limit the travel of the platen 29 to a distance slighter greater than the maximum thickness of the piece parts 10 which are being tapped. A lock screw 39 threaded in the block 34 serves to lock the adjusting bushing 38 in adjusted position. A pin 40 fixed in the block 34 and slidable in a bore in the platen 29 serves to prevent turning of the platen about the post 32.

The platen 29 is stressed for movement upwardly by a spring 41, one end of which fits into a recessed end of the post 32 and the other end of which rests against a plug 42 threaded in the bushing 38 and locked in position by a lock screw 43. The pressure of the spring exerted on the platen 29 and on the part 10 positioned between the platen and the stripper plate may be adjusted so that it will be sufficient to maintain the part in horizontal position in engagement with the surface 25 of the stripper plate and yet be light enough to allow for free lateral movement of the part 10 by the tapered end of the tap 16 as the tap enters an aperture in the part to permit the self-aligning of the tap with the aperture. The platen 29 has a slot 45 providing clearance for the tap 16 and for reception of the chips cut during the tapping operation. The platen 29 is also provided with seats 46 and 47 on the sides thereof for aiding in positioning the parts on the fixture with the apertures 11 in the ends of the part 10 to be tapped in approximate alignment with the tap 16 as shown in Fig. 2.

The platen 29 is normally in its upper position with the face 30 thereof in engagement with the surface 25 of the stripper plate and when it is desired to tap an aperture 11 in one end of the part 10 the end of the part 10 is placed on the surface 30 of the platen and the part 10 and the platen are depressed and the end of the part 10 is moved laterally between the stripper plate and the upper surface of the platen with the aperture 11 in approximate alignment with the axis of the tap after which the part is released, whereupon the spring 41 urges the anvil upwardly to press the end portion of the part 10 against the surface 25 of the stripper plate. The rotating tap 16 is then lowered and as the tapered end thereof engages in the aperture 11 of the part 10 it moves the part to align the aperture 11 with the tap. As the tap advances it presses against the part 10 and the platen 29, causing the part and the platen to move downwardly slightly until the shoulder 36 of the platen seats against the upper end of the sleeve 33, which arrests the movement of the platen and piece part as the tap continues its downward movement during the tapping operation. When the rotation of the tap is reversed and the tap is moved upwardly the platen 29 is urged upwardly therewith by the spring 41 to carry the part back into engagement with the surface 25 of the stripper plate and maintain it in a horizontal position and thus prevent any tilting of the part while the tap is withdrawn therefrom. It will thus be seen that the portion of the part being tapped is held in horizontal position perpendicular to the axis of the tap during the tapping operation and that this insures the accurate tapping of a threaded aperture of a precise size and thus avoids the formation of enlarged tapped apertures, or apertures tapped at the wrong angle in the piece part due to tilting of the piece part prior to or during the tapping operation.

When the apertures 12 in the web of the part 10 are to be tapped the part 10 is supported in the position as shown in Fig. 3 with the web portion of the part held between the stripper plate 20 and the platen 29, and in order to prevent the part from rotating while the tapping progresses a block 50 is provided having a shoulder 51 thereof engageable with the part 10 for holding it against rotation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A fixture for supporting a flat apertured part in a tapping machine comprising a stripper plate having a clearance recess for movement of a tap therethrough and having a flat surface perpendicular to the axis of said tap, a platen having a flat surface parallel to the flat surface on said stripper plate for supporting a flat part while it is being tapped and for pressing the part against the stripper plate, said platen having an element extending therefrom in a direction parallel to said axis, a sleeve on said element for supporting the element and the platen for movement parallel to said axis and having an end engageable with the platen for limiting the movement thereof away from the stripper plate, means for fixedly supporting said stripper plate and for supporting said sleeve for axial movement, means on said supporting means for adjusting the position of the sleeve to vary the range of movement of said platen to and from said stripper plate, and resilient means for urging said platen toward said stripper plate to yieldably support a part therebetween for lateral movement to allow the tap to engage the aperture in the part and align the part therewith, said platen having a portion extending beyond the stripper plate to permit the platen to be engaged by a part and moved thereby away from the stripper plate sufficiently to allow the part to be slid between the stripper plate and the platen.

2. A fixture for supporting a flat apertured part in a tapping machine comprising a stripper plate having a clearance recess for movement of a tap therethrough and having a flat surface perpendicular to the axis of said tap, a platen having a flat surface parallel to the flat surface on said stripper plate for supporting a flat part while it is being tapped and for pressing the part against the stripper plate, said platen having an element extending therefrom in a direction parallel to said axis, a sleeve on said element for supporting the element and the platen for movement parallel to said axis and having an end engageable with the platen for limiting the movement thereof away from the stripper plate, means for fixedly supporting said stripper plate and for supporting said sleeve for axial movement, means on said supporting means for adjusting the position of the sleeve to vary the range of movement of said platen to and from said stripper plate, resilient means for urging said platen toward said stripper plate to yieldably support a part therebetween for lateral movement, said platen having a portion extending beyond the stripper plate to permit the platen to be engaged by a part and moved thereby away from the stripper plate sufficiently to allow the part to be slid between the stripper plate and the platen, and means for adjusting the resilient means to vary the pressure exerted thereby on the platen.

3. A fixture for supporting a flat apertured part in a tapping machine comprising a stripper plate having a clearance recess for movement of a tap therethrough and having a flat surface perpendicular to the axis of said tap, a platen having a flat surface parallel to the flat surface on said stripper plate for supporting a flat part while it is being tapped and for pressing the part against the stripper plate, means for fixedly supporting the stripper plate and for supporting the platen for movement relative to the stripper plate parallel to the axis of said tap, resilient means for urging the platen toward the stripper plate to yieldably support a part therebetween for lateral movement to allow the tap to engage the apertured part and align the aperture therewith, means for adjusting the resilient means to vary the pressure of the platen against the part, stop means on said supporting means for stopping the movement of said platen away from said stripper plate, and means for adjusting the stop means to vary the movement of the strip in accordance with the width of the part being tapped and to stop the platen in a position spaced from the stripper plate a distance slightly greater than the thickness of the part, said platen having a portion extending beyond the stripper plate to permit the platen to be engaged by a part and moved thereby away from the stripper plate sufficiently to allow the part to be slid between the stripper plate and the platen.

References Cited in the file of this patent

UNITED STATES PATENTS

| | | |
|---|---|---|
| 195,321 | Worsley | Sept. 18, 1877 |
| 2,346,297 | Garbe | Apr. 11, 1944 |
| 2,612,794 | Pleasance | Oct. 7, 1952 |

FOREIGN PATENTS

| | | |
|---|---|---|
| 606,835 | Great Britain | Aug. 20, 1948 |